United States Patent [19]
Langley et al.

[11] Patent Number: 5,964,929
[45] Date of Patent: *Oct. 12, 1999

[54] PROCESS FOR THE PRODUCTION OF INK CONCENTRATES

[75] Inventors: Robert Langley, Glasgow; Paul Kerwin, Renfrewshire; Arthur Stark Walls, Kilmarnock; Kenneth Grant Dykes, Glasgow, all of United Kingdom

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,299

[22] Filed: Nov. 13, 1996

[30] Foreign Application Priority Data

Nov. 16, 1995 [GB] United Kingdom .................... 9523387

[51] Int. Cl.$^6$ .................................................. C09B 67/50
[52] U.S. Cl. ................. 106/31.66; 106/31.6; 106/31.78; 106/31.49; 106/31.85; 106/31.88; 106/412; 106/413
[58] Field of Search ..................... 106/412, 413, 106/31.6, 31.66, 31.78, 31.49, 31.85, 31.88

[56] References Cited

U.S. PATENT DOCUMENTS

| | | | |
|---|---|---|---|
| 3,849,150 | 11/1974 | Schrempp et al. ....................... | 106/410 |
| 4,371,642 | 2/1983 | Jaffee ...................................... | 106/412 |
| 4,371,643 | 2/1983 | Thomas .................................. | 106/412 |
| 4,427,810 | 1/1984 | Chisvette et al. ........................ | 524/88 |
| 4,478,968 | 10/1984 | Jaffee ...................................... | 106/412 |
| 4,522,654 | 6/1985 | Chisvette et al. ........................ | 106/412 |
| 4,833,197 | 5/1989 | Schelhaas et al. ....................... | 524/594 |
| 5,006,173 | 4/1991 | Fath et al. ................................ | 106/410 |
| 5,175,282 | 12/1992 | Roth et al. ............................... | 540/141 |

FOREIGN PATENT DOCUMENTS

| | | |
|---|---|---|
| 2013064 | 8/1990 | Canada . |
| 0221466 | 5/1987 | European Pat. Off. . |
| 0350687 | 1/1990 | European Pat. Off. . |
| 0392334 | 10/1990 | European Pat. Off. . |
| 2143945 | 9/1973 | France . |
| 1149898 | 4/1969 | United Kingdom . |
| 1402011 | 8/1975 | United Kingdom . |
| WO 95/17473 | 6/1995 | WIPO . |

OTHER PUBLICATIONS

"Tetrahydrofuran", in "Hawley's Condensed Chemical Dictionary", 11th ed. Van Nostrand, NY, p. 1135, Dec. 1987.
Derwent Abst 90–016050 of EP 350687 Jul. 1990.
Derwent Abst. 81–44835D of JP 56–047436 Apr. 1981.

*Primary Examiner*—Mark L. Bell
*Assistant Examiner*—Scott L. Hertzog
*Attorney, Agent, or Firm*—Kevin T. Mansfield; David R. Crichton

[57] ABSTRACT

A process for the preparation of an ink concentrate which comprises
(a) milling a crude metal phthalocyanine to reduce the particle size thereof, thereby forming a modified crude metal phthalocyanine and
(b) kneading a mixture of the modified crude metal phthalocyanine together with an ink vehicle comprising one or more ink solvents, the metal phthalocyanine being present in an amount of 20 to 80% by weight of the kneaded mixture, to give an ink concentrate containing the metal phthalocyanine in pigmentary form dispersed in the ink vehicle.

19 Claims, No Drawings

PROCESS FOR THE PRODUCTION OF INK CONCENTRATES

This invention relates to a process for the production of an ink concentrate, i.e. a dispersion of an organic pigment in an ink vehicle, particularly a printing ink vehicle, comprising a solvent and, optionally, other components such as a binder and additives, which dispersion contains 20–80% by weight of the pigment and can be "let down", i.e. diluted, to give a final printing ink by the addition of further ink vehicle.

Conventional processes for the production of inks or ink concentrates containing metal phthalocyanine pigments have required the crude metal phthalocyanine to be subjected to prolonged grinding in a ball mill or kneader in the presence of an inorganic salt followed by further conditioning and isolation to convert the crude metal phthalocyanine into a pigmentary form, which is then dispersed, usually with further grinding, in an ink vehicle. In WO 95/17473 it has been proposed to prepare ink concentrates by milling crude copper phthalocyanine in an organic ink solvent; the proposed process requires the use of a specialised dispersing agent and a specialised fluidising agent.

It has now surprisingly been found that ink concentrates containing a pigmentary metal phthalocyanine can be obtained without the need for prolonged grinding and without the need to use specialised dispersing and fluidising agents by firstly milling crude metal phthalocyanine to reduce its particle size and then kneading the smaller particles of crude metal phthalocyanine together with a solvent component of the ink and, optionally, a binder component of the ink. Possible environmental problems associated with the use of an inorganic salt grinding aid can thereby be avoided and the overall processing time required to progress from crude metal phthalocyanine to ink concentrate can be considerably reduced. Printing inks having excellent dispersion, strength, gloss and flow properties can be obtained from the resulting concentrates.

Accordingly, the present invention provides a process for the preparation of an ink concentrate which comprises (a) milling a crude metal phthalocyanine to reduce the particle size thereof, thereby forming a modified crude metal phthalocyanine, and (b) kneading a mixture of the modified crude metal phthalocyanine together with an ink vehicle comprising one or more ink solvents, the metal phthalocyanine being present in an amount of 20 to 80% by weight of the kneaded mixture, to give an ink concentrate containing the metal phthalocyanine in pigmentary form dispersed in the ink vehicle.

The milling step (a) is preferably carried out in a ball mill, although other grinding apparatus having a similar effect, for example an attritor, can be used if desired. In the milling step, the crude metal phthalocyanine is preferably in admixture with a resin and/or an organic liquid. The resin may be a resin conventionally used as a resin or binder component of a printing ink concentrate, or a resin compatible with such a component and other components of the ink concentrate to be produced. Examples of suitable resins, where the ink concentrate to be produced is an oil-based concentrate, are rosins, including phenolic-modified rosins and maleic-modified rosins, alkyd resins, hydrocarbon resins and mixtures of two or more thereof, with phenolic-modified rosins and maleic-modified rosins being preferred. Where the ink concentrate to be produced is an aqueous concentrate, water-compatible resins such as acrylic resins are usually more suitable. Where a resin is used in the milling step (a), it is usually in particulate form.

Organic liquids suitable for use in the milling step (a) may be those conventionally used as a solvent component of a printing ink concentrate, or a liquid compatible with such a component. The liquid may be a material which is solid at ambient temperature but is liquid at the elevated temperature resulting from the milling process. Suitable liquids include long chain aliphatic alcohols, i.e. those having at least 12 carbon atoms, for example 12 to 20 carbon atoms, such as lauryl alcohol (dodecyl alcohol), tridecanol, myristyl alcohol, cetyl alcohol, margaryl alcohol, stearyl alcohol and oleyl alcohol and aliphatic carboxylic acids having at least 4 carbon atoms, for example 4 to 20 carbon atoms, such as butyric acid, hexanoic acid, n-octanoic acid, 2-ethylhexanoic acid, nonanoic acid, decanoic acid, lauric acid, myristic acid, palmitic acid, stearic acid and oleic acid. Especially preferred organic liquids are cetyl alcohol, lauryl alcohol and 2-ethylhexanoic acid.

A fluidising agent may be milled together with the crude metal phthalocyanine in the milling step (a). Suitable fluidising agents include salts of long chain aliphatic amines, e.g. those having one or more chains of at least 10 carbon atoms, e.g. 10 to 20 carbon atoms, with a sulphonated metal phthalocyanine, especially sulphonated copper phthalocyanine.

The modified crude metal phthalocyanine produced by the milling step (a) generally has particle sizes from 5 to 50 microns, compared with about 10 to 100 microns for the crude phthalocyanine before milling. The percentage of the phthalocyanine in the beta crystal form is generally reduced by the milling, although to a lesser extent when an organic liquid is milled with the phthalocyanine. The milled product generally has the characteristics of a ball milled intermediate.

Where a resin is used in the milling stage (a), it may be used generally in an amount of 0.1 to 50%, preferably 2 to 30%, especially 5 to 15%, by weight of the crude metal phthalocyanine. When an organic liquid is used in the milling stage (a) it is used in an amount, generally 0.1 to 20% by weight of the crude phthalocyanine, such that the product of the milling stage (a) is in particulate form, not caked or wet form.

The kneading step (b) of the process of the invention may be carried out in a batch kneader or, preferably, an extruder, especially a twin-screw extruder which may have, for example, 1 to 30 mixing zones, more usually 3 to 20 mixing zones. The modified crude metal phthalocyanine obtained by the milling step (a) may be fed to an extruder in admixture with the ink vehicle, or the ink vehicle may be fed separately to the extruder. The ink vehicle may consist wholly of an organic liquid as hereinbefore described as suitable for use in milling step (a), i.e. a liquid conventionally used as a solvent component of a printing ink concentrate or a liquid compatible with such a component, where such liquid is a liquid at ambient temperature. Alternatively, the ink vehicle may comprise one or more ink solvents, for example one or more organic liquids as hereinbefore described, optionally together with one or more ink binders and, optionally also, other known components of ink vehicles such as conventional additives.

In one preferred embodiment of step (b) the modified crude metal phthalocyanine obtained by the milling step (a) is fed to an extruder together with an organic liquid such as one or more of those hereinbefore described as usable in the milling step (a). In another preferred embodiment, the modified crude metal phthalocyanine obtained by the milling step (a) and the organic liquid are fed separately to the extruder. In both embodiments, any remaining part of the ink vehicle is preferably supplied to the extruder through one inlet before the, or the first, mixing zone.

The ink solvent component of the ink vehicle may be used in step (b) in an amount of 0.1 to 100%, preferably 15 to 50% by weight, based on the weight of the metal phthalocyanine. The temperature at which the kneading step (b) is carried out, e.g. the barrel temperature of the extruder, may be generally from 20 to 200° C., preferably from 50 to 150° C. The shear gradient applied to the materials to be extruded may be adjusted by adjusting the screw speed. This shear gradient is generally from 300 to 20,000s$^{-1}$, preferably 500 to 5000s$^{-1}$.

The nature of the solvent, binder and other components of the ink vehicle is determined generally by the type of ink concentrate which it is desired to produce. The process of the invention may be used to produce concentrates for printing inks of various types, for example lithographic, letterpress, flexographic gravure and serigraphic inks, which may be based on organic or aqueous solvents.

Amongst the solvents which may be used are one or more of the following: alcohols such as methanol, ethanol, propanols and butanols, aliphatic hydrocarbons such as hexane, heptane, octane and high boiling mineral oils known as printing ink distillates, aromatic hydrocarbons such as toluene and xylene, esters such as ethyl acetate, isobutyl acetate, isopropyl acetate, amyl acetate and 2-ethoxyethyl acetate, glycol ethers such as 2-ethoxyethanol and 2-n-butoxyethanol and ketones such as methyl ethyl ketone and cyclohexanone.

Amongst the binders which may be used are one or more of the following: rosins, including polymerised rosins, phenolic-modified rosins and maleic modified rosins, usually in admixture with a plasticizing thermoplastic resin, alkyd resins, acrylic polymers, nitrocelluloses, polyamides, polystyrenes and epoxy resins.

Examples of other known components of ink vehicles which may be kneaded with the phthalocyanine in step (b) or added during subsequent processing of the ink concentrate are drying oils, driers, waxes, antioxidants, surfactants, other pigments, particularly white pigments such as titanium dioxide, stabilisers and, especially, dispersing agents and fluidising agents. Preferred dispersing agents are long chain carboxylic acids, particularly poly(hydroxycarboxylic acids) and their salts. Preferred fluidising agents are salts of long chain, aliphatic amines i.e. those with one or more chains of at least 10 carbon atoms, e.g. 10 to 20 carbon atoms, with a sulphonated metal phthalocyanine, particularly sulphonated copper phthalocyanine.

In the kneading step (b), the relative amounts of the modified crude metal phthalocyanine from the milling step (a) and the ink vehicle with which it is kneaded may be such that the kneaded mixture, and therefore the ink concentrate produced, contains from 20 to 80%, preferably 30 to 70%, especially 40 to 60%, by weight of metal phthalocyanine. The product of the kneading step is an ink concentrate containing the metal phthalocyanine in pigmentary form, predominantly in the beta crystal form. The concentrate may be let down, ie. diluted, with further ink vehicle to give a final ink or an intermediate let-down product which can be supplied as a feeding stock to an inkmaker and further diluted with ink vehicle to give the final ink. The let-down of the concentrate can be carried out using conventional procedures.

The process of the invention is particularly useful for the preparation of ink concentrates where the metal phthalocyanine is copper phthalocyanine, but may also be used for the production of ink concentrates containing other metal phthalocyanines, for example zinc or nickel phthalocyanine, or chlorinated and/or brominated copper phthalocyanine.

The process of the invention may be used to produce ink concentrates for printing inks of various types, including lithographic inks, offset inks, letterpress inks, aqueous inks and publication gravure inks.

The invention is illustrated by the following Examples, in which parts and percentages are by weight, unless otherwise specified.

EXAMPLE 1

8570 g. of crude copper phthalocyanine (CuPc) and 430 g. of a phenolic modified rosin are placed in a revolving ball mill and ground for 5 hours to give a ball milled intermediate (BMI). The crystal form of the milled material is 48% alpha. The BMI is supplied to a co-rotating twin screw extruder (MP 2030 type of APV, Newcastle-under-Lyme UK) together with cetyl alcohol such that the CuPc to cetyl alcohol ratio is 3:1. The total powder feed rate is 0.9 kg hr$^{-1}$. A printing ink varnish consisting of approximately 5 parts hard rosin, 8.3 parts printing ink distillate and 1.7 parts alkyd resin is supplied as a liquid to the extruder before the first mixing zone, through one inlet only, at a rate of 0.6 Kghr$^{-1}$. The barrel temperature of the extruder is set at 110° C. and the screw speed is set at 500 rpm, resulting in an applied shear gradient of 1674s$^{-1}$. The discharge temperature of the concentrate is 110° C.–115° C. The resulting printing ink concentrate has a pigmentary CuPc content of 43% by weight and is predominantly in the beta modification.

The pigmentation of the concentrate is subsequently reduced to 25% with more of the ink varnish using a high speed stirring apparatus at 400 rpm and 60° C. for 20 minutes, before being passed through a three roll mill under a pressure of 10 bar to remove air from the mixture. The 25% concentrate is further reduced to 15% pigmentation using a Muller dispersing apparatus. The final ink shows excellent dispersion, strength, gloss and flow properties.

EXAMPLE 2

8182 g of crude copper phthalocyanine (CuPc) and 818 g of a phenolic modified rosin are placed in a revolving ball mill for 10 hours to give a BMI. The crystal form of the milled material is 62% alpha. The BMI is kneaded on a co-rotating twin screw extruder as in Example 1, producing a concentrate containing 42% by weight CuPc. The letdown procedure of Example 1 is used to give a final ink having excellent strength, gloss, flow and dispersibility.

EXAMPLE 3

8823 g of crude copper phthalocyanine (CuPc) and 177 g of cetyl alcohol are placed in a revolving ball mill for 10 hours to give a BMI. The crystal form of the milled material is 15% alpha. The BMI is kneaded in a co-rotating twin screw extruder as in Example 1, producing a concentrate containing 42% pigmentary CuPc. The letdown procedure of Example 1 is used to give a final ink having excellent strength, gloss, flow and dispersibility.

EXAMPLE 4

8823 g of crude copper phthalocyanine (CuPc) and 177 g of 2-ethyl hexanoic acid are placed in a revolving ball mill for 10 hours to form a BMI. The crystal form of the milled material is 12% alpha. The BMI is kneaded in a co-rotating twin screw extruder as in Example 1, producing a concentrate containing 42% pigmentary CuPc. The letdown procedure of Example 1 is used to give a final ink with excellent strength, gloss, flow and dispersiblity.

EXAMPLE 5

8016 g of crude copper phthalocyanine (CuPc), 803 g of phenolic modified hard rosin and 161 g of cetyl alcohol are placed in a revolving ball mill for 10 hours to form a BMI. The crystal form of the milled material is 16% alpha. The BMI is kneaded in a co-rotating twin screw extruder as in Example 1, producing an ink concentrate containing 42% pigmentary CuPc. The letdown procedure of Example 1 is used to give a final ink with excellent strength, gloss, flow and dispersibility.

EXAMPLE 6

8181 g of crude copper phthalocyanine (CuPc), and 819 g of a maleic modified hard rosin are placed in a revolving ball mill for 10 hours to form a BMI. The crystal form of the milled material is 62% alpha. The BMI is kneaded in a co-rotating twin screw extruder as in Example 1, producing an ink concentrate containing 42% pigmentary CuPc. The letdown procedure of Example 1 is used to give a final ink having excellent strength, gloss, flow and dispersibility.

EXAMPLE 7

8181 g of crude copper phthalocyanine (CuPc), and 819 g of hydrogenated wood rosin (trade name "Staybelite") are placed in a revolving ball mill for 10 hours to form a BMI. The crystal form of the milled material is 62% alpha. The BMI is kneaded in a co-rotating twin screw extruder as in Example 1, producing an ink concentrate containing 42% pigmentary CuPc. The letdown procedure of Example 1 gives a final ink having excellent strength, gloss, flow and dispersibility.

EXAMPLE 8

8065 g of crude copper phthalocyanine (CuPc), 806 g of a phenolic modified hard rosin and 129 g of a modified copper phthalocyanine supplied by Zeneca under the trade name "Soisperse 5000" are placed in a revolving ball mill for 10 hours to form a BMI. The crystal form of the final milled material is 62% alpha. The BMI is supplied to a co-rotating twin screw extruder (as in Example 1) together with cetyl alcohol such that the CuPc to cetyl alcohol ratio is 3:1. The total powder feed rate is 1.45 Kghr$^{-1}$. A printing ink varnish consisting of 1 part of a hyperdispersant supplied by Zeneca under the trade name "Solsperse 17000", 3.83 parts printing ink distillate, 2.92 parts hard resin and 1 part alkyd resin is simultaneously supplied to the extruder, before the first mixing zone and through one inlet only, at a rate of 0.58Kghr$^{-1}$. The barrel temperature of the extruder is set at 110° C. and the screw speed is set at 500 rpm, resulting in an applied shear gradient of 1674s$^{-1}$. The discharge temperature of the concentrate is 110–115° C. The resulting printing ink concentrate has a pigmentary CuPc content of 49% and is predominantly in the β modification. The concentrate is diluted to give a 25% concentrate and then a final ink using the letdown procedure of Example 1. The ink has excellent gloss, flow, strength and dispersion properties.

EXAMPLE 9

8823 g of crude copper phthalocyanine (CuPc) and 177 g of cetyl alcohol are placed in a revolving ball mill and ground for 5 hours to form a BMI. The crystal form of the milled material in 15% alpha. The BMI is supplied to a co-rotating twin screw extruder as in Example 1 together with more cetyl alcohol such that the CuPc to cetyl alcohol ratio is 4.5:1. The total powder feed rate is 0.9 Kghr$^{-1}$. A printing ink varnish consisting of approximately 5 parts hard rosin, 8.3 parts printing ink distillate and 1.7 parts alkyd resin is supplied as a liquid to the extruder in the first zone, through one inlet only, at 0.82 Kghr$^{-1}$. The barrel temperature of the extruder is set at 110° C. and the screw speed is set at 500 rpm, resulting in an applied shear gradient of 1674s$^{-1}$. The discharge temperature of the concentrate is 110° C.–115° C. The resulting printing ink concentrate has a pigmentary CuPc content of 43% and is predominantly in the β modification. The concentrate is diluted to give a 25% concentrate and then a final ink using the letdown procedure of Example 1. The final ink has excellent dispersion, strength, gloss and flow properties.

EXAMPLE 10

An ink concentrate containing 42% by weight CuPc is produced as in Example 2. The pigmentation of the concentrate is reduced to 25% by mixing 59.72 parts thereof with a let-down material consisting of Alvco 1407 (25.74 parts), a solvent available from Lawter International, Terlon 3 (11.08 parts) an alkyd resin available from Lawter International and Ink Oil 991 (3.46 parts) available from Sun Lubricants. The 25% concentrate is further reduced to 15% pigmentation with the same let-down material using a Muller dispersing apparatus to give an ink having excellent colour strength, gloss, dispersion and flow properties.

EXAMPLE 11

A BMI as prepared in Example 1 is supplied to a co-rotating twin screw extruder having a length:diameter ratio of 40:1 (MP 2065, available from APV, Newcastle-under-Lyme, UK) such that the total powder feed rate is 21.89 kg per hour. Cetyl alcohol is supplied to the extruder using a separate loss-in-weight feeder such that the feed rate is 6.63 kg per hour. A printing ink varnish as described in Example 1 is supplied to the extruder before the first mixing zone, through one inlet only, at a rate of 19.01 kg per hour. The barrel temperature of the extruder is set at 110° C. and the screw is set at 600 rpm, resulting in an applied shear gradient of 2009s$^{-1}$. The discharge tempeture of the concentrate is 110–120° C. The concentrate has a pigmentary CuPc content of 42% by weight and is predominantly in the beta modification. The pigmentation is reduced to 15% as described in Example 1 to give an ink having excellent dispersion, strength, gloss and flow properties in heatset and sheetfed ink systems.

EXAMPLE 12

Example 1 is repeated except that the ratio of BMI to cetyl alcohol is 6:1. The resulting ink shows excellent strength, gloss, dispersion and flow characteristics.

EXAMPLE 13

8182 g of crude copper phthalocyanine (CuPc) and 818 g of a phenolic modified rosin are placed in a revolving ball mill and ground for 10 hours to give a ball milled intermediate (BMI). The crystal form of the milled material is 62% alpha. The BMI is supplied to a co-rotating twin screw extruder (MP 2030 type of APV, Newcastle-under-Lyme, UK) with a powder feed rate of 0.675 Kghr$^{-1}$. A printing ink varnish consisting of 2.94 parts hard rosin, 4.88 parts printing ink distillate, 1 part alkyd resin and 3.31 parts dodecyl alcohol is supplied as a liquid to the extruder before the first mixing zone, through one inlet only, at a rate of 0.825 Kghr$^{-1}$. The barrel temperature of the extruder is set at 110° C. and the screw speed is set at 500 rpm, resulting in an applied sheer gradient of 1674s$^{-1}$. The discharge temperature of the concentrate is 110–115° C. The resulting printing ink concentrate has a pigmentary CuPc content of 43% by weight and is predominantly in the beta modification. The pigmentation of the concentrate is subsequently reduced to 25% with more of the ink varnish (without the doceyl alcohol component) using a high speed stirring apparatus at 4000 rpm and 60° C. for 20 minutes, before being passed through a three roll mill under a pressure of 1 MPa to remove air from the mixture. The 25% concentrate is further reduced to 15% pigmentation using a Muller dispersing apparatus. The final ink shows excellent dispersion, strength, gloss and flow properties.

EXAMPLE 14

Example 13 is repeated except that the constitution of the ink varnish is 2.70 parts hard rosin, 4.48 parts printing ink distillate, 1 part alkyd resin and 1.28 parts dodecyl alcohol.

The final ink shows similar colouristic properties to the product obtained in Example 13.

EXAMPLE 15

8182 g of crude copper phthalocyanine (CuPc) and 818 g of a phenolic modified rosin are placed in a revolving ball mill and ground for 10 hours to give a ball milled intemediate (BMI). The crystal form of the milled material is 62% alpha. The BMI is supplied to a co-rotating twin screw extruder (MP2030 type of APV, Newcastle-under-Lyme, UK) with a powder feed rate of 1.0 kghr$^{-1}$. A printing ink varnish consisting of 2.94 parts hard rosin, 1.94 parts printing ink distillate, 1 part alkyd resin and 1.42 parts dodecyl alcohol is supplied as a liquid to the extruder before the first mixing zone, through one inlet only, at a rate of 1.0 Kghr$^{-1}$. The barrel temperature of the extruder is set at 110° C. and the screw speed is set at 500 rpm, resulting in an applied sheer gradient of 1674s$^{-1}$. The discharge temperature of the concentrate is 110–115° C. The resulting printing ink concentrate has a pigmentary CuPc content of 45% by weight and is predominantly in the beta modification. This concentrate is passed over a three roll mill at 40° C. under a pressure of 1 MPa. The pigmentation of the concentrate is subsequently reduced to 15% with more ink varnish (without the dodecyl alcohol component) using a high speed stirring apparatus at 5000 rpm and 60° C. for 10 minutes. The final ink shows excellent strength, gloss, flow and dispersion properties.

What is claimed is:

1. A process for the preparation of a non-aqueous ink concentrate suitable for use as a stir in concentrate for forming non-aqueous ink compositions which process comprises
    (a) milling a crude metal phthalocyanine to reduce the particle size thereof, thereby forming a milled crude metal phthalocyanine; and
    (b) kneading the modified crude metal phthalocyanine together with a non-aqueous ink vehicle comprising one or more organic ink solvents which is an aliphatic alcohol having at least 12 carbon atoms or an aliphatic carboxylic acid having at least 4 carbon atoms with a shear gradient from 300 to 20,000 s$^{-1}$, the metal phthalocyanine being present in an amount of 20 to 80 % by weight of the kneaded mixture, to give a non-aqueous lithographic ink or letterpress ink concentrate containing the metal phthalocyanine in pigmentary form dispersed in the non-aqueous ink vehicle.

2. A process according to claim 1, in which the milling step (a) is carried out in a ball mill.

3. A process according to claim 1, in which in step (a) the crude metal phthalocyanine is in admixture with a resin or an organic liquid or a resin and an organic liquid.

4. A process according to claim 3, in which the resin is a rosin.

5. A process according to claim 4, in which the rosin is a phenolic-modified rosin or a maleic-modified rosin.

6. A process according to claim 3, in which the organic liquid is cetyl alcohol, lauryl alcohol or 2-ethylhexanoic acid.

7. A process according to claim 3, in which the resin is used in an amount of 0.1 to 50% by weight, based on the weight of the crude metal phthalocyanine.

8. A process according to claim 3, in which the organic liquid is used in an amount of 0.1 to 20% by weight, based on the weight of the crude metal phthalocyanine.

9. A process according to claim 1, in which the kneading step (b) is carried out in a twin-screw extruder.

10. A process according to claim 9, in which the modified crude metal phthalocyanine is fed to the extruder together with an organic liquid usable in the milling step (a) or the modified crude metal phthalocyanine and said organic liquid are fed separately to the extruder.

11. A process according to claim 9, in which the extruder has one or more mixing zones and the remaining part of the ink vehicle is supplied to the extruder through one inlet before the first mixing zone or directly into the first mixing zone.

12. A process according to claim 1, in which the kneading step (b) is carried out at 20 to 200° C.

13. A process according to claim 12, in which the kneading step (b) is carried out at 50 to 150° C.

14. A process according to claim 1, in which a shear gradient from 300 to 20,000 s$^{-1}$ is applied during the kneading step (b).

15. A process according to claim 1, in which the kneaded mixture contains 30 to 70% by weight of metal phthalocyanine.

16. A process according to claim 1, in which the kneaded mixture contains 40 to 60% by weight of metal phthalocyanine.

17. A process according to claim 1, in which the ink vehicle also contains a binder and, optionally, one or more additives.

18. A process according to claim 1, in which the metal phthalocyanine is copper phthalocyanine.

19. A printing ink produced by diluting an ink concentrate obtained by a process according to claim 1 with an ink vehicle comprising one or more ink solvents.

* * * * *